May 20, 1969     J. M. ELLUL     3,444,839

AUTOMATIC SPRAY PAINTING MACHINE

Filed Dec. 27, 1965     Sheet _1_ of 2

INVENTOR
JOSEPH M. ELLUL

BY *Douglas R McKechnie*
ATTORNEY

United States Patent Office 3,444,839
Patented May 20, 1969

3,444,839
AUTOMATIC SPRAY PAINTING MACHINE
Joseph M. Ellul, Poughkeepsie, N.Y., assignor to International Business Machines Corporation, Armonk, N.Y., a corporation of New York
Filed Dec. 27, 1965, Ser. No. 516,438
Int. Cl. B05c 11/14, 11/10; G05b 19/00
U.S. Cl. 118—2
14 Claims

ABSTRACT OF THE DISCLOSURE

A paint spraying system has a conveyor line for carrying different sized workpieces through a spray booth past a plurality of sprayers. Each sprayer is selectively operated in accordance with a program element carried by the conveyor in conjunction with each workpiece to be operated upon. Operation of the sprayers is controlled by a series of timers each designed so that, when conditioned and activated, it will operate the selected sprayer for a different predetermined period of time. The workpieces are arranged on the conveyor in different series whereby the workpieces in each series are to be sprayed for the same period of time. Program elements are arranged on either end of each series so as to selectively condition and de-condition the timer that operates the sprayer for the desired period. Additional program elements are mounted on the conveyor next to each workpiece to be sprayed for selectively activating the conditioned timer and sprayer.

Figure 1:
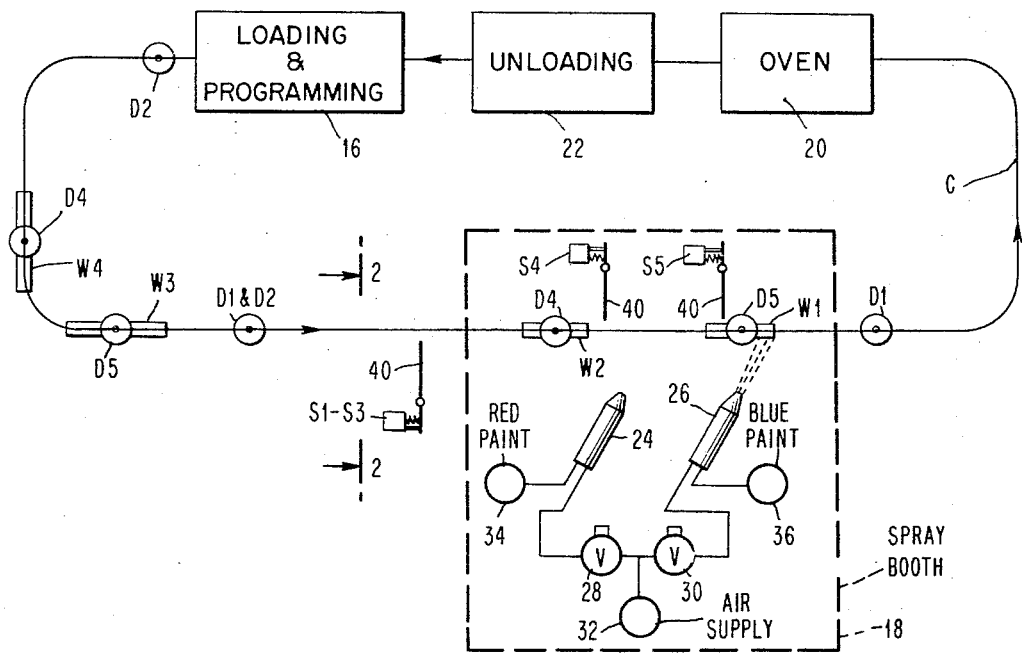

This invention relates to manufacturing systems of the type wherein manufacturing operations are selectively performed on workpieces automatically under program control as the workpieces are carried through a work station by a conveyor.

In the past, many manufacturing systems have been devised for automating portions or all of a production line wherein workpieces are moved by some form of a conveyor through a work station. At the work station, a manufacturing operation is performed on each work piece and this operation may range from the simple task of repetitively performing the same operation on identical workpieces, as each one passes through the station, to the more complex tasks of performing different operations on different sized workpieces for different periods of time as they pass through the work station. Prior art systems for the control of the latter type of operations have been relatively elaborate, complex and costly, and one of the main objects of the invention is to provide a simple, inexpensive system for automatically and selectively performing timed operations on different workpieces.

Another object of the invention is to provide a simple means for controlling an operating unit which performs a manufacturing operation on a workpiece as it is conveyed by the operating unit, the means being capable not only of performing the operations on certain ones of the articles while not performing it on other articles, but also of performing operations on different articles for different periods of time.

While the invention in its broad aspects is applicable to manufacturing systems in general, it is especially advantageous when used in a system, such as a spraying line, wherein a coating material is applied to each article and the article is then passed through an oven to dry the coating. Thus, another object of the invention is to provide a system for controlling the spraying of a material on articles carried by a conveyor wherein the control system is unaffected by any clogging or accumulation of coating material particles and wherein it includes control elements carried by the conveyor, which elements are unaffected by the heat as they pass through the drying oven.

Briefly stated, in the preferred embodiment of the invention, a plurality of programming elements are carried by the conveyor system. Certain of the elements are operative to set a timing means for controlling the time of an operation, and other of the elements, which are associated with the individual workpieces, are effective to control which of the workpieces the operations are to be performed upon. The elements are adapted to actuate switches located along the conveyor in the path of travel of the programming elements to set the timing means and to actuate the operating unit.

The foregoing and other objects, features and advantages of the invention will be apparent from the following more particular description of a preferred embodiment of the invention as illustrated in the accompanying drawings.

Figure 2:
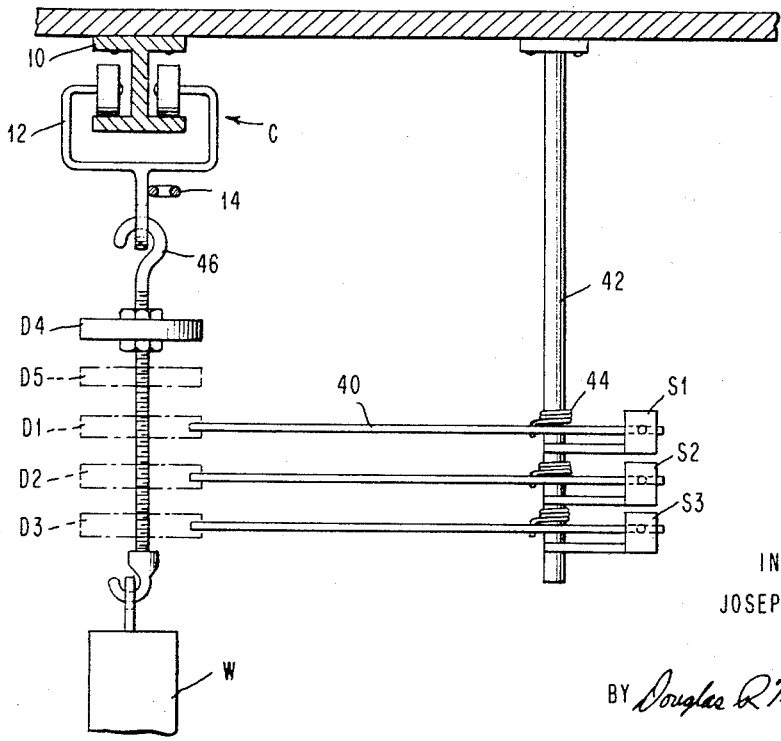
Figure 3:
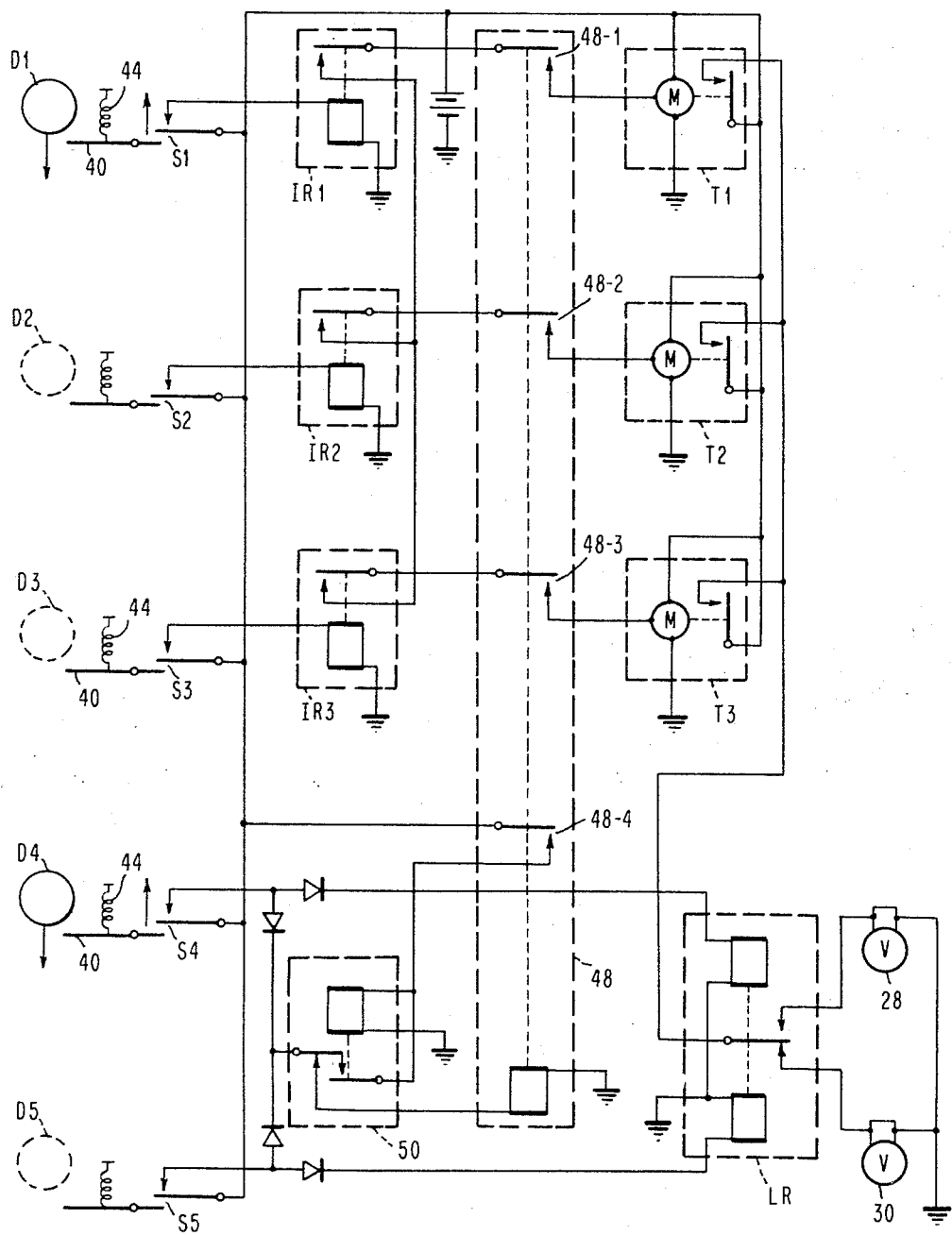

In the drawings:
FIG. 1 is a schematic view of a manufacturing system embodying the invention;
FIG. 2 is a detail view looking along line 2—2 of FIG. 1; and
FIG. 3 is a schematic wiring diagram of the control system.

Referring now to the drawings, the invention is illustrated as embodied in a manufacturing system wherein the manufacturing operations to be performed upon each workpiece involve first coating it with paint of a predetermined color and then drying the paint in an oven. The system includes a conventional overhead conveyor line C comprising a track 10 defining the path of travel of the conveyor. A plurality of workpiece carriers 12 are supported by rollers on track 10, and are connected at spaced intervals to a chain 14 that is continuously driven at a uniform speed whereby movement of the chain pulls carriers 12 along track 10. Conveyor C extends through a loading and programming station 16, a spray booth 18, an oven 20, and an unloading station 22. The workpieces are placed on the conveyor C at loading station 16 and the control disks, discussed hereinafter, are placed on the conveyor so as to provide the desired control. At spray booth 18, each workpiece is coated with either a red paint or a blue paint. Next, the workpieces are transported through oven 20 where the paint is dried in a conventional fashion, and then the workpieces and program disks are unloaded in the unloading station 22.

Two conventional spray guns 24 and 26 are located in spray booth 18. The spray guns are of a type in which solenoid operated valves 28 and 30 control the supply of pressurized air from an air supply 32 to the guns for spraying paint from supplies 34 and 36 onto workpieces as they travel in front of the guns and in the path of the spray emitting from the guns. The spray guns are operated one at a time under the control of disks D4 and D5. The spray guns are spaced longitudinally along conveyor C a distance less than the minimum distance between the leading and trailing edges of any two successive workpieces to insure that each workpiece is fully covered by the respective sprays.

Spaced along and adjacent to conveyor C are five switches S1–S5. Each switch is a single-pole, single-throw normally-open type. Each switch is actuated in a similar fashion so that only one need be described in detail. With reference to FIG. 2, a feeler arm 40 is pivotally mounted on a support 42. One end of the feeler arm is located adjacent switch S1 for actuating it and the other end is located in the path of travel of a control disk D1 carried by conveyor C in a manner more fully described below. A helical torsion spring 44 biases feeler arm 40 to a position where it will engage any disk D1, and wherein switch S1 is in its normally open position. As a disk D1 is transported past the feeler arm 40, it pivots the feeler arm against the bias of spring 44 and closes switch S1. After the disk has passed by the feeler arm, the feeler arm moves to its normal position under the bias of spring 44 and switch S1 opens.

Switches S1–S5 are located at different heights and are adapted to be selectively actuated by control disks D1–D5, respectively, which are carried along conveyor C at different heights. As shown in FIG. 2, each workpiece W is carried on the lower end of a support member or hanger 46 having a threaded shaft headed at both ends by hooks and suspended from a carrier 12. Disks D1–D3 select the time for which each workpiece is to be sprayed and disks D4–D5 select the color with which each workpiece is to be sprayed and initiate the spraying operation. Switches S1–S3 are located outside of and in front of spray booth 18. Switches S4 and S5 are located in spray booth 18.

Each programming or control disk is numbered according to the vertical position it occupies, and a disk may be shifted from a position such as D4 to position D2 to thereby change its designation. Some hangers 46 carry only one disk and others carry a plurality of disks. While the illustrated disks are changeable, it might be preferable under some circumstances to provide a disk and support member such that the disk can be readily removed or shifted between positions in a manner more quickly than could be accomplished in the illustrated embodiment. However, the illustrated embodiment might be more desirable where an operator has available to him at the programming station a series of hangers 46 with the control disks prelocated so that the operator need only select the hanger having the desired disk or disks thereon and place it on the conveyor C.

With reference to FIG. 3, switches S1–S3 are connected to impulse relays IR1–IR3 respectively and control the supplying of pulses to operate the impulse relays. Each impulse relay is conventional and includes a single-pole, single-throw switch whose contacts alternate between open and closed positions in response to successive pulses applied to the electromagnetic coil thereof. Relays IR1–IR3 are connected through single-pole, single-throw, normally-open contacts 48-1 through 48-3 respectively, of a control relay 48, to timing switches T1–T3, respectively, for selecting which one of the timing switches will be operated when relay 48 is energized. Each timing switch is of a type which includes some form of a motive means M that, upon being actuated, closes the normally open contact of the switch for a predetermined period of time. Timing switches T1–T3 are set to different periods of time dependent upon how long a spray gun must be operated in order to coat a particular article. Obviously, the period of time is dependent upon the speed of the conveyor and the workpieces. Preferably, the switches are adjustable so that the periods of time can be varied.

Timing switches T1–T3 control operation of solenoid valves 28 and 30 in accordance with the setting of a latch relay LR. Relay LR contains two coils adapted to move a single-pole, double-throw switch in opposite directions, the pole latching in each position so as to require energization of the opposing coil to move it to the other position. Switches S4 and S5 control operation of latch relay LR, whereby actuation of switch S4 causes LR to connect valve 28 to the timing relays, and switch S5 actuates LR to connect valve 30 to the timing relays.

Relay 48 is energized when either switches S4 or S5 close, and its operation is under the control of a relay 50 having a single-pole, double-throw, make-before-break contact arrangement. Relay 50 is provided to prevent the spray guns from being continuously operated in the event that movement of the conveyor line is stopped with either control disk D4 or D5 positioned so as to hold switches S4 or S5 closed. When either of switches S4 or S5 is initially closed, current flows through the normally closed contact of relay 50 and energizes the coil of relay 48. When contacts 48-4 close, the coil of relay 50 is energized. When the contacts of relay 50 have transferred, relay 48 de-energizes and relay 50 is held energized through and until the switch S4 or S5 which initiated actuation, opens.

The operation of the invention is further explained with reference to the illustrative specific example illustrated in FIG. 1. In the example, workpieces W1 and W2 are to be sprayed with blue and red paint respectively for the same period of time, determined by timer T1, and workpieces W3 and W4, because they are of either a different size or shape, are to be sprayed for a different period of time as set by timer T2. To initiate the operation, a control disk D1 is placed on conveyor C at the programming station ahead of W1 and W2, and it actuates switch S1, as it passes by the feeler 40 associated therewith, causing relay IR1 to close and thereby condition or enable a circuit to actuate timer T1 in response to energization of relay 48. Workpiece W1 is placed on conveyor C with a control disk D5 on the supporting hanger, and W2 is placed on the conveyor with control disk D4. As conveyor C carries workpieces W1 and W2 through spray booth 18, disks D5 and D4 initiate the control action that causes spray guns 26 and 24 to spray the workpieces with the desired coatings.

In order to change the time of the spraying operation, a second control disk D1 is placed on conveyor C after workpieces W1 and W2 pass through the spray booth and it, upon actuation of switch S1, causes relay IR1 to open and thereby disconnect the timer T1. A second disk D2 is mounted on hanger 46 with D1 for setting the time for which workpieces W3 and W4 are to be sprayed. A second disk D2 is placed on conveyor C after workpieces W3 and W4 and actuates switch S2 to open relay IR2 after the workpieces have been sprayed.

It should be noted with reference to each of the operating units. spray gun 24 or 26, that the control disks D4 and D5 are selective as to which spray gun is actuated. This principle of selective actuation of an operating unit wherein a workpiece that passes in front of the unit may or may not be operated or acted on, can be applied to other systems. For example, the system can include only a single operating unit for acting on only certain ones of the workpieces conveyed thereby for a time determined by disks D1–D3. Under such circumstances, disks D4 and D5 can be eliminated and the workpiece itself or a hanger 46 can act as a control element to initiate the operation. This latter mode may require modifying the hanger 46 which supports D1–D3 so that it does not inadvertently initiate an operation when none is desired.

Another advantage of the system is that the control disks are mechanical elements capable of withstanding the heat encountered in the oven. Furthermore, the use of the relays and relatively inexpensive disks provides a simple, low cost control system. The system is unaffected by the accumulation of paint particles, and switches S4 and S5, in order to carry out this latter objective, may be suitably enclosed in some form of a protective enclosure or hood.

What is claimed is:

1. For use in a manufacturing system having at least one normally inoperative operating unit for acting on a workpiece, and a conveyor for moving different size workpieces serially along a predetermined fixed path of travel past said operating unit, the combination comprising:
   control means adapted to operate said operating unit for different periods of time during which said unit acts on workpieces;
   program means adapted to be carried by said conveyor in association with said workpieces for selecting each workpiece to be acted upon and the period during which it will be acted upon by said operating unit;
   and second means responsive to said program means for actuating said control means to selectively operate said operating uuit for said different periods of time in accordance with said program means.

2. The combination of claim 1 wherein said workpieces are arranged on said conveyor in different series according to the time during which said operating unit is to act on a workpiece, and:

said control means comprises timing means adapted to operate said operating unit for different predetermined periods;

said program means comprises first program means adapted to be carried by said conveyor ahead of each series of workpieces, for conditioning said timing means to operate said operating unit for one of said predetermined periods;

and said program means further comprises second program means adapted to be carried by said conveyor in association with said workpieces, for selectively actuating said timing means to cause said operating unit to selectively operate on said workpieces for said predetermined periods in accordance with said first and second program means.

3. The combination of claim 2 wherein:
said timing means comprises a plurality of timers each adapted to operate said operating unit for a different predetermined period;
and said control means is operative to selectively condition said timers one-at-a-time.

4. The combination of claim 2 wherein:
said first program means comprises a plurality of program elements arranged for travel along a plurality of zones corresponding to the number of different periods, and said first program means further comprises a plurality of detectors each arranged in a different zone for detecting the presence therein of one of said program elements.

5. The combination of claim 2, wherein it is for use in a system that comprises a second operating unit for acting selectively on said workpieces independently of said first-mentioned operating unit, said second operating unit being in series with said first mentioned unit whereby all workpieces move past both units serially, and said second program means comprises a plurality of program elements arranged in two zones, there being one zone for each operating unit; and said second means further comprises two detectors each arranged in a different zone for detecting the presence therein of one of said program elements.

6. The combination of claim 5 wherein each workpiece is to be selectively acted upon by one or the other of said operating units, and said program elements are arranged so that only one program element is associated with each workpiece and such element is positioned in one of said two zones.

7. The combination of claim 2 wherein each of said program means comprises a holder adapted to be detachably mounted on said conveyor, and an element that is settable in a plurality of positions corresponding to the functions to be programmed thereby.

8. For use in a spraying system having a normally inoperative sprayer that is operative when acutated to direct a spray of coating material through a spray zone and a conveyor for moving different size articles through said spray zone, the combination comprising:

timing means for controlling operation of said sprayer for different periods of time;

first program means adapted to be carried by said conveyor for selecting the period of time during which said sprayer is to spray a workpiece;

control means responsive to said first program means and operative to condition said timing means for operating said sprayer for a predetermined period of time sufficient to coat an article carried through said spray zone;

second program means adapted to be carried by said conveyor adjacent an article to be sprayed for selectively causing such article to be sprayed;

and third means operatively connected for actuating said timing means in response to movement of said second program means to cause such article to be sprayed for the selected period of time.

9. The combination of claim 8 wherein:
said timing means includes selectively operable means for operating said sprayer for different periods of time;
said control means comprises selectively actuated first switch means connected to said timing means for condi.ioning said timing means for operation, said first switch means being connected to selectively actuate said selectively operable means;
said third means comprises selectively actuated second switch means connected to said timing means to actuate said timing means and thereby operate said sprayer for the period selected by said first switch means;
said first program means is adapted to actuate said first switch means ahead of actuation of said second switch means;
and second program means is adapted to actuate said second switch means each time a workpiece to be sprayed reaches said spray zone.

10. The combination of claim 9 wherein:
said control means comprises a plurality of detectors spaced in different program zones adjacent to said conveyor;
and said first program means comprises a programming element adapted to be mounted on said program zones for actuating said detector associated therewith.

11. The combination of claim 10 wherein:
said first switch means is operatively connected for actuation by said detectors.

12. The combination of claim 11 comprising:
pulse operated relay means controlled by said first switch means and means connecting said detectors to supply pulses to said pulse-operated relay means.

13. The combination of claim 9:
wherein said third means includes a detector actuated by movement of said second program means therepast;
and said combination further includes means for preventing continuous operation of said timing means and said sprayer in the event said second program means is stopped in such a position as to continuously actuate said detector.

14. The combination of claim 9:
wherein the system includes a second sprayer;
said timing means is adapted to operate either sprayer;
and said combination further comprises means responsive to said second program means for selecting which sprayer is to be operated.

References Cited
UNITED STATES PATENTS

| | | | |
|---|---|---|---|
| 2,736,671 | 2/1956 | Ransburg et al. | 118—631 X |
| 2,961,990 | 11/1960 | Wruck | 118—2 |
| 3,077,422 | 2/1963 | Slatkin | 118—2 X |
| 3,207,337 | 9/1965 | Abbey | 134—58 X |

WALTER A. SHEEL, *Primary Examiner.*

JOHN P. McINTOSH, *Assistant Examiner.*